US007583711B2

(12) United States Patent
Tiemann

(10) Patent No.: US 7,583,711 B2
(45) Date of Patent: Sep. 1, 2009

(54) APPARATUS AND METHOD FOR STABILIZING THE FREQUENCY OF LASERS

(75) Inventor: Bruce Tiemann, Longmont, CO (US)

(73) Assignee: Lockheed Martin Coherent Technologies, Inc., Louisville, CO (US)

( * ) Notice: Subject to any disclaimer, the term of this patent is extended or adjusted under 35 U.S.C. 154(b) by 210 days.

(21) Appl. No.: 11/384,030

(22) Filed: Mar. 17, 2006

(65) Prior Publication Data
US 2007/0217456 A1 Sep. 20, 2007

(51) Int. Cl.
*H01S 3/13* (2006.01)
(52) U.S. Cl. ............... 372/29.011; 372/29.01; 372/29.015; 372/32
(58) Field of Classification Search ........... 372/29.01, 372/29.011
See application file for complete search history.

(56) References Cited

U.S. PATENT DOCUMENTS

| 4,839,614 | A | * | 6/1989 | Hill et al. ............... 359/238 |
| 4,955,026 | A | * | 9/1990 | Hill et al. ............... 372/18 |
| 5,970,076 | A | | 10/1999 | Hamada |
| 6,665,321 | B1 | * | 12/2003 | Sochava et al. ........... 372/20 |
| 7,327,471 | B2 | | 2/2008 | Tiemann |
| 2002/0164125 | A1 | | 11/2002 | Berger et al. |
| 2004/0091002 | A1 | | 5/2004 | Watterson et al. |

OTHER PUBLICATIONS

Hansch, T.W. et al., "Laser Frequency Stabilization by Polarization Spectroscopy of a Reflecting Reference Cavity," Optics Communications, vol. 35, No. 3, pp. 441-444, Dec. 1980.

Drever, R. W. P. et al, "Laser Phase and Frequency Stabilization Using an Optical Resonator," Applied Physics B, vol. 31, pp. 97-105, Feb. 1983.

Sandford, S. et al., "Laser Frequency Control Using an Optical Resonator Locked to an Electronic Oscillator," IEEE Journal of Quantum Electronics, vol. 33, No. 11, pp. 1991-1996, Nov. 1997.

Klimenko, S. et al., "Simulation of Input Optics with LIGO End-to-End Model," Internal Working note of the LIGO Project LIGO-T990100-00-D, pp. 1-17, joint publication of Laser Interferometer Gravitational Wave Observatory (LIGO) by California Institute of Technology, Pasadena, CA, USA and Massachusetts Institute of Technology, Cambridge, MA, USA, May 1998.

(Continued)

Primary Examiner—Minsun Harvey
Assistant Examiner—Xnning Niu
(74) Attorney, Agent, or Firm—McDermott Will & Emery LLP

(57) ABSTRACT

Method and apparatus are disclosed that enable lasers to be stabilized in absolute frequency to high precision. The principle of operation is to: 1) lock the laser frequency to an etalon transmission resonance, 2) phase modulate the laser beam at a frequency corresponding to the free spectral range of the etalon and lock the phase modulated sidebands to the etalon resonances, and 3) lock the etalon free spectral range frequency to a stable reference frequency derived from, e.g., a stable crystal oscillator. The result is that the laser frequency is locked to an integer multiple of the reference frequency. The invention has applicability to numerous situations where a stable frequency must be provided at a specific value, and has further applicability to stabilizing multiple lasers in different locations to the same value.

12 Claims, 8 Drawing Sheets

OTHER PUBLICATIONS

Ma, Long-Sheng et al., "Ultrasensitive Frequency-Modulation Spectroscopy Enhanced by a High-Finesse Optical Cavity: Theory and Application to Overtone Transitions of C2H2 and C2HD," Journal of Optical Society America B, vol. 16, No. 2, pp. 2255-2268, Dec. 1999.

Slagmolen, B. J. J. et al., "Frequency Stability of Spatial Mode Interference (Tilt) Locking," IEEE Journal of Quantum Electronics, vol. 38, No. 11, pp. 1521-1528, Nov. 2002.

Carrig, Timothy J., "Transition-Metal-Doped Chalcogenide Lasers," Journal of Electronic Materials, vol. 31, No. 7, pp. 759-769 (2002).

* cited by examiner

APPARATUS AND METHOD FOR STABILIZING THE FREQUENCY OF LASERS

1. FIELD OF THE INVENTION

This invention is in the field of lasers, more specifically relating to apparatus and methods for producing highly stable laser oscillation frequencies.

2. BACKGROUND OF THE INVENTION

Lasers are used in many applications where the oscillation frequency of the device is utilized as a clock. At the extreme end of applications stabilities better than 1 part in $10^{14}$ enables lasers to be used to synchronize clocks worldwide for highly precise time measurements. These systems require extremely high degrees of isolation against environmental disturbances (such as temperature variations and vibrations) since even minute changes in the length of laser cavities causes variations in the laser frequency. Stable lasers are also required in applications such as coherent laser radar systems. In these systems laser radiation is sent from a sensor location to a target that may be many km distant and the change in phase of the signal upon return to the sensor is used to measure properties of the target. Such measurements rely on measuring the phase very accurately by heterodyning the return signal with a local oscillator beam and comparing the received phase with the transmitted phase. If there is a change in the local oscillator frequency while the pulse is in transit to the target and back, these phase measurements become inaccurate. For an order of magnitude estimate of stability requirements in these circumstances it is noted that phase errors must typically be $<<\pi$ radians over the round-trip time $t=2$ R/c, where R is the target range and c is the speed of light=$3 \cdot 10^8$ m/s. For a target range of 50 km the round-trip time is 0.33 msec giving an angular frequency stability requirement of $<<\pi/0.33$ ms, or a frequency stability better than $\Delta f = 1.5$ kHz. For a laser with an emission wavelength $\lambda=1.5$ µm the frequency is given by $f=c/\lambda=2 \cdot 10^{14}$ Hz, thus leading to a fractional frequency stability requirement of $\Delta f/f=7.5 \; 10^{-12}$. To further put this into context, the frequency of a laser is determined by a standing wave formed in an optical cavity of length L whose resonant frequency is a multiple m of the quantity c/2L (assuming the cavity is a vacuum). Changing the cavity length by a small amount $\Delta L$ causes a frequency deviation magnitude given by $|\Delta f|/f=\Delta L/L$. For a cavity length of 1 cm, a frequency of $2 \cdot 10^{14}$ Hz, and a frequency stability requirement of 1.5 kHz, the tolerance on the length $\Delta L$ is then $7.5 \cdot 10^{-14}$ m, or 0.000075 nm, an extraordinarily small number given that, for example, the diameter of a hydrogen atom is approximately 0.1 nm.

Over the years several techniques have successfully been developed to build lasers with frequency stabilities to meet these stringent demands. This is generally not done by directly stabilizing the laser and its environment, but rather by active means, whereby a highly stable and environmentally isolated "frequency reference" is created such that the laser emission frequency can be stabilized to this frequency reference. Although a number of techniques currently exist the perhaps best known is the so-called PDH technique named after Pound, Drever, and Hall who pioneered the technique for microwave signals and transferred these developments to laser cavities. The invention disclosed herein applies equally well to all techniques that rely on locking a laser to a cavity, such as an etalon. Alternatives to the PDH technique include polarization locking (see for example T. W. Hansch, B. Couillaud, "Laser frequency stabilization by polarization spectroscopy of a reflecting reference cavity," Opt. Comm., Vol. 35, 3, 441-444, 1980) and tilt locking (see for example B. J. J. Slaggmolen et al. "Frequency Stability of Spatial Mode Interference (Tilt) Locking", IEEE Journal of Quantum Electronics, vol. 38, no. 11, November 2002). The PDH technique is often favored because it is very robust in many ways, such as being stable against intensity fluctuations of the laser. However the PDH technique and other techniques like it suffer from a significant limitation. These techniques are generally aimed at stabilizing the laser frequency to a reference determined by a passive device, such as an etalon, rather than stabilizing the frequency in absolute terms. Thus, if the reference frequency drifts, for example if the etalon resonance frequency drifts, then the laser frequency drifts along with the reference.

This issue of absolute frequency stability is important in a number of applications and has been addressed in various ways to meet specific requirements. It is obvious that when lasers are used as length standards, the absolute frequency of the laser must be known to extremely high precision. The way this is normally achieved is to stabilize the frequency against an atomic resonance frequency. Since such resonance frequencies are very specific, stabilizing a laser at an arbitrary predetermined frequency against such a reference requires complex frequency conversion stages. At a lower precision level frequencies must also be absolutely known for optical communications systems. Fiber optics systems are commonly operated on the so-called ITU (International Telecommunications Union) grid that defines absolute frequency channels to be used by the communications devices. Locking of frequencies to the ITU channels is therefore required. However, the current ITU grid is defined based on frequency channels separated by 50-100 GHz, so it is generally sufficient for communications lasers to be stabilized to on the order of 1 GHz. This relatively relaxed condition can typically be met using wavelength locking techniques that, for example, utilize a temperature stabilized low finesse etalon and a tunable laser to ensure that light is transmitted through the etalon. A third example where absolute frequency stability is required is when coherent laser radar systems are simultaneously used in multiple locations. In such circumstances, if a phase measurement made in one place is to be correlated with one made in a different location, the "clock" lasers used to establish validity of the interferometric phase measurements must operate synchronously. To ensure such clock synchronization the simple wavelength locking techniques used in telecommunications systems are highly unsuitable because sufficient stabilities cannot be guaranteed with simple etalon transmission techniques. On the other hand the complex frequency conversion schemes used for length standards are also unsuited because of complexity, cost, and bulk.

One system has been proposed by S. Sandford and C. Antill, Jr. ("*Laser frequency control using an optical resonator locked to an electronic oscillator*", IEEE Journal of Quantum Electronics, vol. 33, pp. 1991, Nov. 1997) to stabilize the cavity free spectral range (FSR) frequency, in order to obtain absolute frequency stability. In the Sandford and Antill method two laser systems are locked to two adjacent etalon cavity modes, and their difference frequency, located in the radio frequency (RF) domain, is then stabilized by means of phase/frequency comparison to a stable RF reference. Any drift of the etalon dimension is detected as a change of FSR, and hence, permits corrective action to take place that holds the FSR constant. If the FSR isn't changing, then the optical frequencies themselves are constrained. One obvious drawback with this approach is the need for two lasers, which results in additional cost and system complexity. Additionally the FSR in this method is being measured as a difference between two independent laser locks. This causes locking noise to enter into the FSR measurements at a level of the square root of 2 times the locking noise strength assuming equivalent locks. It would be preferable to have a method to measure FSR that had no sensitivity to laser locking noise.

3. SUMMARY OF THE INVENTION

From the above discussion it is clear that it would be highly desirable to have a method that permits lasers to be stabilized in absolute frequency using relatively simple means. This invention provides such a method. As noted in the previous section all clocks need to be referenced to something that acts as an absolute frequency reference. In the present invention this frequency reference is a radio-frequency (RF) or microwave oscillator that operates at a known and highly stable frequency $f_{ref}$. The essence of the invention is to lock the frequency of a laser using a single high finesse etalon having a free spectral range that can be tuned to equal $f_{ref}$. This is done in a multi-step fashion. First the laser is locked to a transmission peak of the etalon using, for example, the PDH technique. Simultaneously the laser frequency is phase modulated to generate frequency sidebands near $f_{ref}$. Adding a small dither of this frequency permits an error signal to be derived by lock-in detection of the etalon cavity response at the dither frequency. By this means, the modulation frequency can be locked to the exact cavity FSR splitting frequency. In the third step, this modulation frequency is itself locked to that of the stable RF reference, which can be, for example, an ovenized quartz crystal oscillator or a cesium clock. If the cavity FSR frequency drifts, an error signal is generated from this last lock which is in turn used to alter the FSR to the reference frequency value. By this means the laser's absolute frequency is constrained.

For many applications it is not necessary to know exactly which multiple of $f_{ref}$ is used. In cases where this is important two principal approaches can be taken. In one approach the etalon length is chosen to be such that substantially only one FSR fits within the gain bandwidth of the laser. This has the effect of substantially reducing the laser power if the system tries to pull the frequency to the wrong etalon order. In another approach an optical filter can be added to the system that only transmits light in a spectral window near the desired frequency.

The benefits of this invention include, but are not limited to:
A single etalon is used to absolutely stabilize the frequency of a laser.
The disclosed method can be used to stabilize the frequency of lasers to a far higher precision than methods that rely on simple techniques, such as maximizing the transmission through an etalon.
The disclosed method is far less complex and less costly to implement than conventional techniques that rely on the schemes typically used with lasers intended for length standards.

4. BRIEF DESCRIPTION OF THE DRAWINGS

DETAILED DESCRIPTION OF THE INVENTION

Figure 1:
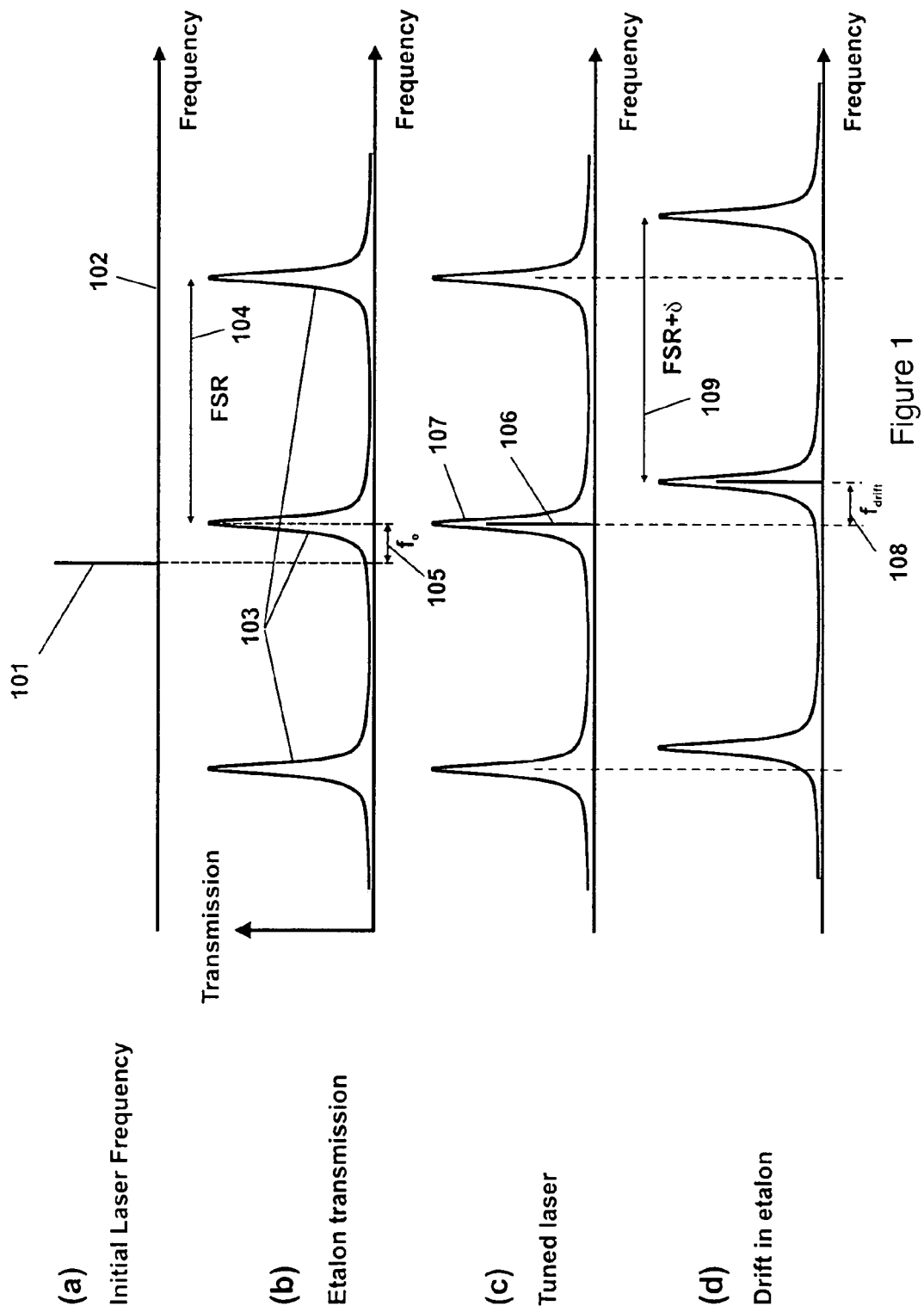
FIG. 1 illustrates the principle of the invention in terms of laser frequency and etalon transmission curves.

We now describe the invention with reference to the attached figures. In FIG. 1(a) (Prior Art) is shown the position of a laser frequency 101 along a frequency axis 102, as is produced by any single longitudinal mode laser. Without any controls nothing prevents the laser from drifting back or forth along the frequency axis by an amount that generally varies depending upon the type of laser involved. In the absence of a reference against which the laser frequency can be compared, it is even impossible to say whether the position of the laser frequency is correct or incorrect. Clearly, if one produces multiple such lasers that drift independently one has little or no control over their absolute frequencies and consequently differences in frequency between them.

Even in cases where the mean position of the laser is relatively stable, small disturbances cause the frequency to jitter, which introduces an uncertainty in the frequency at any given time. It is to minimize this jitter that etalon stabilization techniques are used, with the general idea that a passive etalon can be made more insensitive to external disturbances than can the active laser.

The idea of using an etalon (mirror cavity) is illustrated in FIG. 1(b). In this figure is shown the transmission spectrum of an etalon as a function of frequency. The transmission spectrum is characterized by peaks ("orders") 103 separated in frequency by the free spectral range FSR, as indicated by arrow 104. The FSR for an air-spaced etalon equals c/2L, where c is the speed of light and L is the distance between the mirrors that form the etalon. More generally if the etalon is spaced by a material with refractive index n the FSR is c/2nL. In general the laser frequency 101 of the laser does not happen to fall on one of the transmission peaks, but differs by some amount $f_e$ as indicated by 105. It is the purpose of conventional locking circuitry, such as the PDH technique, to tune the laser frequency to one of the transmission peaks. When this is done the situation shown in FIG. 1(c) occurs. Here the laser frequency 106 has been tuned to the center of the middle spectral transmission peak 107 of the etalon. As is well known in the art, this locking of the laser frequency to the etalon can be done with very high precision, such that the laser frequency jitter is reduced to, for example, less than 1 kHz, or even significantly less for lasers intended for very high frequency stability.

The limitation of this simple approach is illustrated in FIG. 1(d). Since the laser is locked to the etalon transmission peak, any drift in the etalon peak causes the laser frequency to follow that drift. In general an etalon drift is caused by small changes in the optical length L of the etalon. This can be caused by a change in temperature which causes the etalon material to expand or contract. Since the absolute frequency of a transmission peak is given by Nc/2L, where N is an integer, the effect on the spectrum is two-fold. The change in FSR by an amount δ, as shown by arrow 109, alters the spacing between peaks. At the same time the whole pattern slides by an amount $f_{drift}$ as indicated by 108. The effect of this change in FSR forms the basis for the invention. By forcing the FSR not to change, the laser frequency cannot drift, for the following reasons. First, if the laser tries to drift off an etalon peak then the conventional PDH locking circuitry forces it back to the center. This technique is well known and will not be discussed in detail here. Second, if the etalon tries to drift and thereby pull the laser frequency with it, then we detect the change in FSR and bring it back to the desired value. The preceding is true in the absence of dispersion. Dispersion, as may be present due to materials filling the etalon or to coatings) alters the exact frequency spacing between etalon orders, but does not alter the validity of the method disclosed here, so long as the dispersion is stable.

5. DESCRIPTION OF THE PREFERRED EMBODIMENT

Figure 8:
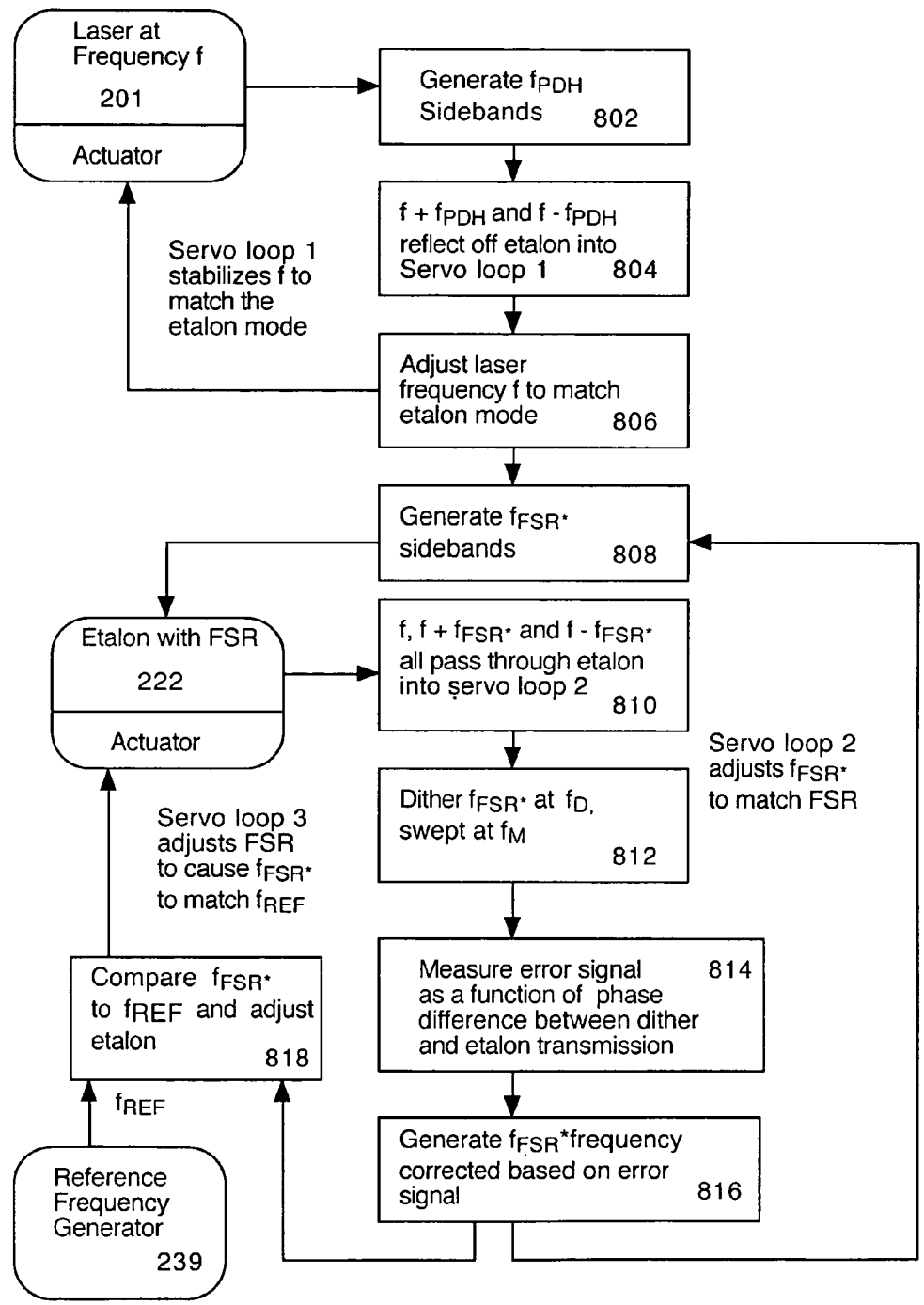
FIG. 8 is a flow diagram illustrating the three servo loops used to stabilize the laser frequency.

A detailed description of the frequency stabilization system will be given below. Since the system involves multiple lock-loops we will begin by summarizing the process with reference to the diagram in FIG. 8. Note that FIG. 8 is intended to show the steps performed in achieving the three servo locks, but that in fact generally all three locking processes are occurring at the same time as the system runs. In some cases, when the system is first turned on, one servo lock loop may be turned on at a time in order to do a rough adjustment first, followed by finer adjustments.

Note also that while specific methods of generating the relevant error signals are shown and described here for clarity, other methods may be used.

A laser 201 whose frequency f is to be stabilized is phase modulated in step 802 to generate PDH sidebands frequency shifted by an amount $f_{PDH}$, thereby producing three frequencies at $f-f_{PDH}$, f, and $f+f_{PDH}$. Some portion of the signals at frequencies $f-f_{PDH}$, f, and $f+f_{PDH}$ reflect off of etalon 222 (step 804). If laser 201 frequency f is centered on the etalon order, the intensities of the reflected sideband frequencies will be equal. Unequal sideband intensites indicate an asymmetry where the laser frequency is not centered on the transmission peak and laser frequency f is adjusted in step 806 to center it. The first servo (servo loop 1) is used in conjunction with an actuator that permits altering of the laser frequency f. The purpose of servo loop 1 is therefore to alter the laser frequency such that the laser frequency is locked to an etalon order using (in this example) the PDH locking technique.

The next lock loop (lock loop 2) is used to lock auxiliary sidebands at the modulation frequency $f_{FSR}^*$ to the cavity FSR, $f_{FSR}$. This is done by phase modulating the laser frequency with the frequency $f_{FSR}^*$ in step 808 in order to generate a second set of sidebands, thereby producing frequencies $f-f_{FSR}^*$, f, and $f+f_{FSR}^*$. These sidebands pass through etalon 222 in step 810. In step 812, frequency $f_{FSR}^*$ is slowly dithered at a low frequency $f_M$, causing a periodic excursion of the sideband frequency between $f_{FSR}^*-f_D$ and $f_{FSR}^*+f_D$, and synchronous detection is used to determine whether the applied frequency $f_{FSR}^*$ equals the actual etalon free spectral range $f_{FSR}$. Step 814 determines an error signal related to the phase difference between the dither signal and the etalon transmission (both vary at $f_M$, but the phase of the etalon response will vary depending upon how well $f_{FSR}^*$ is matched to the etalon FSR). Step 816 corrects the frequency $f_{FSR}^*$ based on this error signal. This correction propagates back to step 808, so that the sidebands are also corrected. Servo loop 2 is then used to adjust $f_{FSR}^*$ to match the actual FSR of the etalon. At this stage the frequency of the laser is locked to the center of an etalon order and the second modulation frequency $f_{FSR}^*$ is locked to the etalon free spectral range.

The third and final servo loop (servo loop 3) is used to adjust the etalon FSR to match a frequency reference generated by a source 239. This is done by comparing $f_{FSR}^*$ to $f_{REF}$, and then adjusting the etalon FSR accordingly. Since servo loop 2 is matching $f_{FSR}^*$ to the etalon FSR, the result is that the etalon FSR comes to match the frequency reference. Step 818 generates an error signal based upon the difference between $f_{REF}$ and $f_{FSR}^*$ and adjusts the etalon accordingly.

Figure 2:
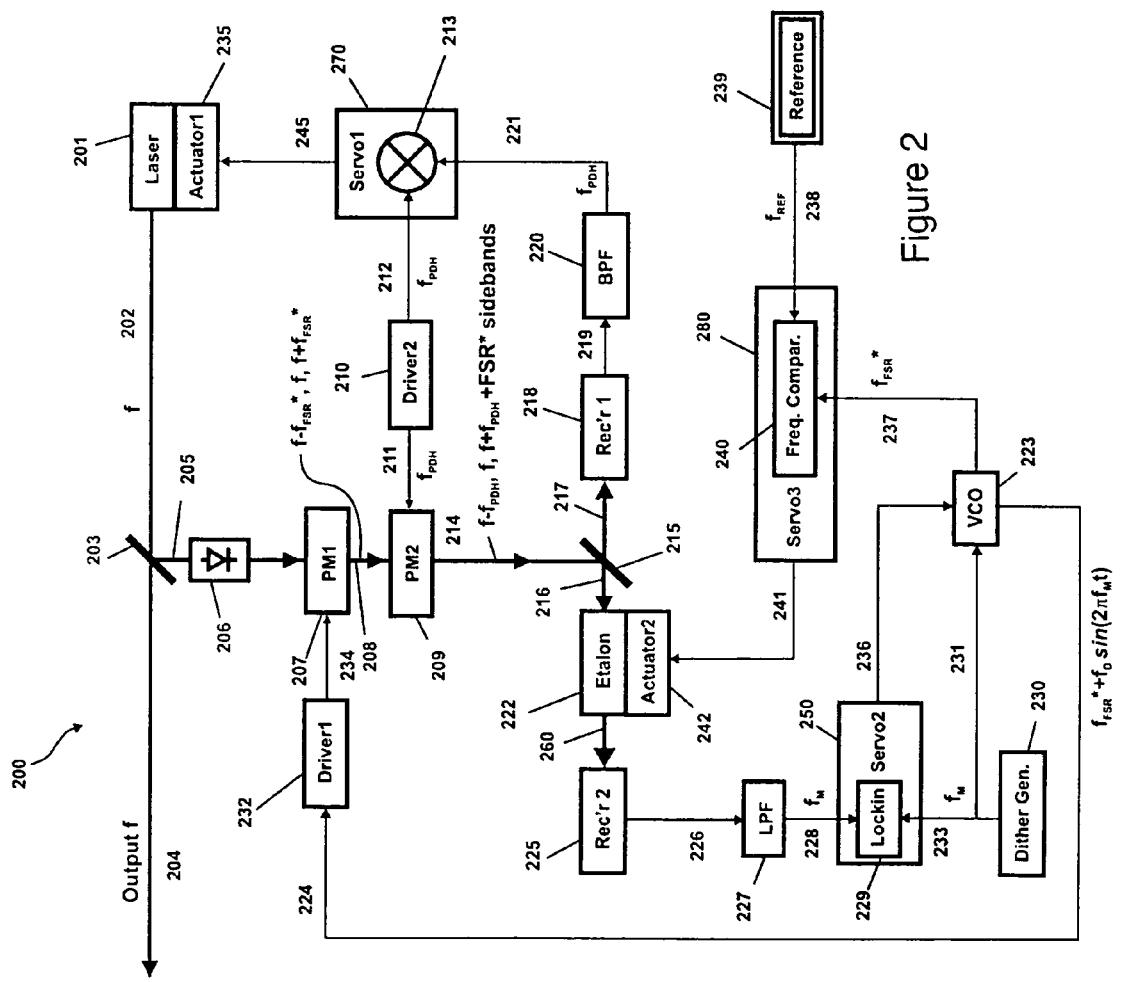
FIG. 2 illustrates the preferred embodiment of the invention.
Figure 3:
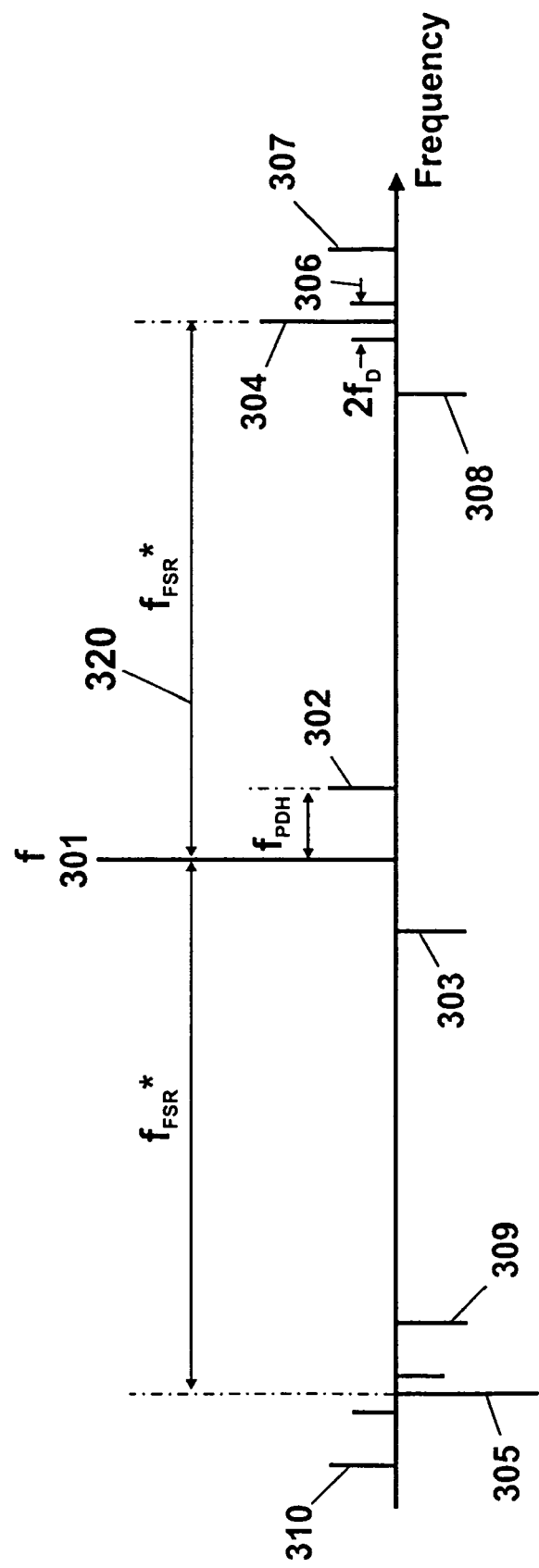
FIG. 3 illustrates the relationship of frequencies used to implement the invention.
Figure 4:
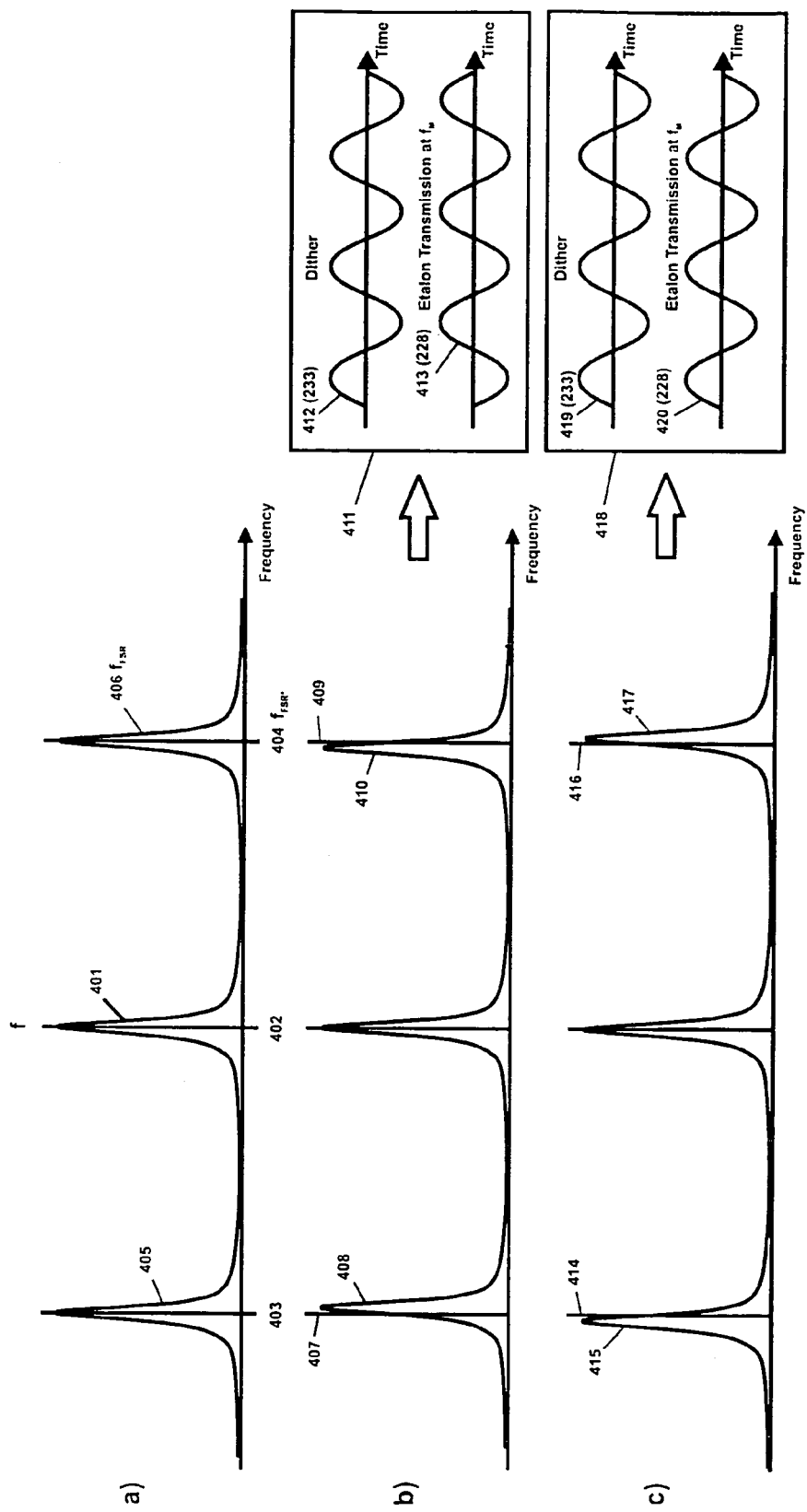
FIG. 4 illustrates the relationship between frequency dither and error signals.

A first preferred embodiment of the present invention is illustrated by FIGS. 2, 3, and 4. Briefly, the technique of locking a laser 201 to an external reference 239 includes the following steps. First, laser 201 frequency 402 is locked to a transmission peak 401 of etalon 222 via actuator 235. Simultaneously, the laser frequency 402 is phase modulated to generate frequency sidebands $f+f_{FSR}^*$ and $f-f_{FSR}^*$ 304, 305, which are matched to the FSR of the etalon. Finally, the etalon is adjusted to cause $f_{REF}$ to match $f_{FSR}^*$.

We now describe in detail a preferred embodiment of the invention with reference to FIG. 2. FIG. 2 shows a laser frequency stabilizing system 200 having a laser 201 whose frequency f is to be stabilized.

The following table discussing the most important signals at various points may be helpful in following the description of FIG. 2 below. Note that the signals indicated as present are present when the laser is at least partially stabilized. Generally only signals important to the operation of the system are listed (e.g. doubled frequencies are generally ignored)

TABLE 1

Signals in FIG. 2

| Signal Reference No. | Signal(s) Present | Notes |
| --- | --- | --- |
| 202, 205, 204 | laser optical frequency f | |
| 208 | f, $f+f_{FSR}^*$, $f-f_{FSR}^*$ | Signals 301, 304, 305 in FIG. 3 |
| 211, 212 | $f_{PDH}$ | |
| 214 | f, $f+f_{FSR}^*$, $f-f_{FSR}^*$ plus PDH sidebands on all | 301, 304, 305 plus 302, 303, 307, 308, 309, and 310 |
| 217 | Portions of $f+f_{PDH}$, and $f-f_{PDH}$ | When f is centered on an etalon order, the intensities of $f+f_{PDH}$ and $f-f_{PDH}$ are equal |
| 221 | $f_{PDH}$ | with phase and amplitude based on relative intensities of $f+f_{PDH}$, and $f-f_{PDH}$ (detuning between 401 and 301) |

TABLE 1-continued

Signals in FIG. 2

| Signal Reference No. | Signal(s) Present | Notes |
|---|---|---|
| 245 | control signal 1 | Adjust laser frequency f to center on etalon order |
| 260 | f, f + $f_{FSR}$*, f − $f_{FSR}$* | N.B. portions of PDH sidebands ignored |
| 226 | f, f + $f_{FSR}$*, f − $f_{FSR}$* Intensity of FSR sidebands through etalon | Intensity varies at $f_M$, with phase and amplitude depending upon detuning between $f_{FSR}$* 320 and FSR 104. |
| 236 | control signal 2 | based on phase difference between dither and etalon transmitted intensity at $f_M$ |
| 231, 233 | $f_M$ | dither |
| 224 | $f_{FSR}$*, dithered with magnitude $f_D$ at $f_M$ | |
| 237 | $f_{FSR}$* | N.B. system also works if $f_D$ is on signal 237 |
| 238 | $f_{REF}$ | Stable reference to control both $f_{FSR}$* and FSR |
| 241 | control signal 3 | Adjusts etalon FSR, based on difference between $f_{REF}$ and $f_{FSR}$* |

Returning to FIG. 2, laser 201 produces a laser beam 202 that propagates to a beam splitter 203, which in turn produces two split beams. One split beam 204 is the frequency stabilized output beam of the laser and the second split beam 205 is the beam used for frequency stabilization. Generally beam 205 is sent through an optical isolator 206 to prevent light from the stabilization system from being reflected back towards laser 201. It is noted that optical isolators, such as commonly used Faraday isolators, may be used at this and/or at other points in the system to provide the necessary optical isolation properties, but that the principle of operation of the invention does not in any way depend on the specific location, type or presence of such devices.

Light beam 205 continues through a first phase modulator (PM1) 207 which adds sidebands at frequency $f_{FSR}$* to form signal 208 containing frequency components f−$f_{FSR}$*, f, and f+$f_{FSR}$*. Signal 208 continues further through a second phase modulator (PM2) 209 which adds PDH sidebands at frequency $f_{PDH}$ to form signal 214. The PDH sidebands are generated at each of the three frequency components f−$f_{FSR}$*, f, and f+$f_{FSR}$* resulting in signal 214 having a total of nine frequency components. Referring to FIG. 3, the sidebands added by the first phase modulator 207 are signals 304 and 305 in FIG. 3, and the sidebands added by the second modulator 209 are signals 302, 303, 307, 308, 309, and 310.

The second phase modulator 209 is used to lock the absolute frequency of the laser to a transmission peak of the subsequent etalon 222, while the first phase modulator 207 is used to generate sidebands at $f_{FSR}$* for subsequent locking to etalon FSR at a later stage. Following transmission through PM2 209 the laser beam 214 is reflected from Splitting optic 215 and is incident on etalon 222. For the present discussion it is assumed that PDH locking is used to lock the laser frequency to the etalon. In this case the phase modulation is applied as signal 211 at frequency $f_{PDH}$ using Driver2 210 via PM2. The frequency $f_{PDH}$ of signal 211 may fall in the range of, for example, 1-100 MHz depending on the etalon used, to produce the laser frequency sidebands at f+$f_{PDH}$ and f−$f_{PDH}$. The laser beam 216 containing sidebands is reflected (the sidebands are reflected in part) from the etalon and propagates through splitting optic 215 as beam 217 to a photo-detector (Rec'r 1) 218. The resulting electrical signal 219 is passed through bandpass filter 220 that transmits electrical signals in a frequency band near $f_{PDH}$. The filtered electrical signal 221 is detected by mixer 270 contained within servo (Servo 1) 213. Mixer 270 also receives a signal from Driver 2 210 at $f_{PDH}$ and utilizes the two input signals to produce an output error signal that Servo 213 uses to generate control signal 245, that drives an actuator 235 which controls the laser frequency, in such a manner that the laser frequency becomes locked to an etalon transmission peak.

Splitting optic 215 may be a conventional optical beam splitter coated such that part of an incident beam is transmitted and part of the incident beam is reflected. In order to minimize loss of light it is often more advantageous to use polarization techniques for this splitting function. In an exemplary technique frequently used in optical systems, the incident beam is linearly polarized and splitting optic 215 is comprised of two elements. The first element is a polarizing beam splitter that reflects substantially all the light of the linearly polarized beam. The second element is a quarter-wave plate that converts the linearly polarized and reflected beam into a circularly polarized beam. Upon reflection from the etalon the circularly polarized beam passes again through the quarter-wave plate and is further rotated by 90 degrees to produce a linearly polarized beam with its polarization axis orthogonal to the original beam 214. With an appropriate coating on splitting optic 215 this polarization can then be substantially completely transmitted as beam 217. This description of splitting element 215 is intended to convey that multiple ways exist to transmit light to, and collect reflected light from, the etalon, but that operation of the invention in the intended manner does not rely on a specific implementation of these optical elements.

Driver 1 232 provides a drive signal 234 to phase modulator PM1 207 at a frequency $f_{FSR}$*, close to the free spectral range FSR of etalon 222, which frequency is also dithered via dither generator 230 at a frequency $f_M$. To clarify, the frequency $f_{FSR}$* is varied over a small range between $f_{FSR}$*−$f_D$ and $f_{FSR}$*+$f_D$ where $f_D$ is the excursion or magnitude of the frequency variation. In other words the sideband frequency can be explicitly written as $f_{FSR}$*+$f_D$·sin($2\pi f_M$t). Note that "$f_{FSR}$*" may be used herein to refer to either a single frequency or to a dithered frequency. Which meaning is intended is indicated by the context.

The signal 224 that drives Driver 1 originates in voltage controlled oscillator (VCO) 223. The phase modulation at $f_{FSR}$* produces frequency sidebands offset from base frequency f by +$f_{FSR}$* and –$f_{FSR}$*. These sidebands are transmitted through etalon 222 as signal 260, and the transmitted intensity is detected using a detector in second receiver (Rec'r 2) 225. The resulting electrical signal 226 is passed through low-pass filter (LPF) 227 having a passband that incorporates the dither frequency $f_M$. The low-pass filtered signal 228 is transmitted to a phase sensitive detector, such as lock-in amplifier 229 contained within Servo2 250, which also receives a signal 233 at $f_M$ from dither generator 230. The lock-in amplifier detects the phase difference between signals 228 and 233 and Servo2 250 provides an output control signal 236 related to the phase difference. This control signal 236 is used to drive VCO 223. VCO 223 also receives as an input the dither signal 231 at frequency $f_M$ with the result that VCO output signal 224 transmitted to Driver 1 comprises a signal that produces phase modulation $f_{FSR}$* near the FSR frequency, on top of which is a small modulation in frequency with magnitude $f_D$ at the dither frequency $f_M$. In relation to phase sensitive detection it is understood that exact phase differences need not be measured. It is generally sufficient to detect the sign of the phase difference, i.e. whether the detected signal leads or lags the modulation. This is sufficient to create a control signal to drive the phase difference in the appropriate direction towards zero. In most practical control systems the magnitude of the error signal is also beneficial and is provided, for example, in systems using the described lock-in technique.

The various modulations resulting from the described implementation are shown in FIG. 3. In FIG. 3 is shown a laser frequency 301 along a horizontal frequency axis. The PDH frequency sidebands are illustrated with numerals 302 and 303 and are used, as discussed above, to lock the laser frequency to an etalon center frequency. The phase modulation at frequency $f_{FSR}$* produces sidebands 304 and 305. The dither at frequency $f_M$ causes the position of the sidebands 304 and 305 to vary slightly over the range indicated by arrow 306. The additional sidebands 307 and 308 near 304 (and similar sidebands near 305) result from PDH sidebands being present as a result of the laser beam first being modulated in PM2 and then in PM1. For illustrative clarity the sidebands are shown as having relatively small separation. In actual systems the sidebands are separated sufficiently in frequency that electronic interferences do not disturb the operation. In general $f_D$, $f_M$ << $f_{PDH}$ << $f_{FSR}$. Typical numbers, used only as an example without being restrictive, may be $f_M$=1 kHz, $f_D$=10 kHz, $f_{PDH}$=10 MHz, and $f_{FSR}$=10 GHz.

As a further aid in understanding the operation of locking the FSR to the etalon we illustrate in FIG. 4 how the dither produces an error signal. In FIG. 4(a) is illustrated a locked condition where laser frequency 402 is locked to etalon transmission peak 401. Simultaneously laser sidebands 403 and 404 (at frequencies f–$f_{FSR}$* and f+$f_{FSR}$*) are locked to etalon transmission peaks 405 and 406 (at frequencies f–$f_{FSR}$ and f+$f_{FSR}$), respectively. In this ideal condition no error signal is produced since $f_{FSR}$*=$f_{FSR}$. However, suppose that $f_{FSR}$ decreases as a result of a change in environmental conditions. This produces the situation in FIG. 4(b). The laser frequency is still locked to the center etalon peak as a result of the PDH locking. However, lower laser sideband 407 no longer coincides with etalon peak 408 and upper sideband 409 no longer coincides with etalon peak 410. Since the etalon transmission curves are proportional to transmitted intensity, less light is transmitted through the etalon when $f_{FSR}$* does not equal $f_{FSR}$. If the laser sideband frequency $f_{FSR}$* is now dithered by a small amount it is clear from the illustration that a small increase in the sideband frequency will cause peak 409 to move to the right while peak 407 moves to the left. Both of these moves will cause less light to be transmitted through the etalon. Similarly, a reduction in $f_{FSR}$* will have the opposite effect of passing more light through the etalon. Consequently, as illustrated in graphic 411, as the frequency of the etalon FSR is dithered as shown by curve 412, the amount of transmitted light 413 varies out of phase with the dither. Note that numbers in parentheses refer to the relevant signals in FIG. 2.

In the opposite case shown in FIG. 4(c) where the etalon has shifted to a larger FSR frequency, the etalon peaks 415 and 417 will be shifted from the laser sidebands 414 and 416 so as to have the opposite effect. A positive frequency dither increases the amount of transmitted light while a negative dither decreases it. Consequently, as illustrated in graphic 418, the etalon transmission will be in phase with the drive frequency dither. Because lock-in detector 229 (FIG. 2) senses differences between applied modulation and etalon response, an unambiguous control signal 236 can be produced by Servo2 250 and sent to VCO 223 to drive the error signal to zero and hence lock the laser sidebands at $f_{FSR}$* to the etalon FSR. Even if there is detuning between the laser center frequency and the cavity mode center frequency, that doesn't alter the FSR measurement. In other words it does not bring new noise into the FSR measurements. As a result the present invention has significant advantages over the prior art, in particular the method disclosed by Sanford and Antill cited in the introduction. Detuning would manifest itself as a shift to the right or left of the laser peaks 402-404 relative to the etalon peaks 401, 405, and 406 in FIG. 4a).

So, for example, referring to the middle plot 4(b): the amplitude of transmitted signal 260, as presented to lockin 229 at 228, has an amplitude proportional to the slope of curve 410 at the location where sideband 409 intersects it. The sign, then, reverses if this intersection occurs on the other side of the peak of curve 410 (as in the bottom plot, 4(c)).

The final step in locking the absolute frequency of the laser is to compare the etalon FSR (proxied by $f_{FSR}$*) with a reference value $f_{REF}$ and adjust the FSR to coincide with the reference value. This is accomplished by providing a highly stable reference frequency 238 from a frequency reference source 239. The degree of stability of the frequency reference depends on the specific application, and while any suitable reference can be used in the invention, we note as an example that ovenized quartz crystal oscillators may provide a frequency stability on the order of 1 part in $10^{11}$. A frequency comparator 240 is used to compare the frequency of VCO output 237 with reference frequency 238. If a difference exists a signal 241 is sent to actuator 242 attached to etalon 222 to alter the optical length of the etalon. In doing so the PDH lock tracks the central etalon peak, while the lock-in detector tracks the laser sidebands at $f_{FSR}$* to the changing etalon free-spectral range. As a result of the described modulations and locking circuits the laser frequency is now locked to the reference frequency 238.

A variety of means can be used to compare the frequencies 237 and 238 and output control signal 241 to actuator 242. One example would to use two frequency to voltage converters in conjunction with a comparator that outputs, for example, a positive control signal 241 if the VCO frequency is higher than the reference frequency, and outputs a negative control signal if the VCO frequency is lower. The actuator 242 can similarly be constructed in a number of different ways.

For example the spacing between two mirrors forming an etalon can be precisely controlled by mounting one mirror on a piezo-electric translator. Alternatively thermal tuning of the etalon (relying on thermal expansion and/or the change in refractive index of a solid etalon) would also be suitable. The manner in which tuning is accomplished is not critical to operating the invention. What matters is the function of altering the etalon FSR in response to an applied control signal. We also note that etalon drift and actuator 242 response time are frequently very slow, for example having a time constant on the order of seconds.

A number of optional features of the invention have not been shown explicitly in FIG. 2 as they are not essential features of the system in operation. These features are, however, frequently deemed highly desirable in a complete laser system. For example, in order to operate the system shown in FIG. 2 it is desirable to implement a control system to ensure that steps taken to achieve the desired frequency control are performed in the proper sequence. This is desired, for example, to handle start-up from a cold start, as well as to sequence events if loss of frequency lock occurs as a result of an inadvertent large perturbation of the system. Such events may clearly be handled in a number of different ways and operation of the invention in the desired manner is not dependent on the exact manner in which the steps are taken. An example of system control would be to carry out the following steps:

1. The laser is activated and permitted to reach a stable operating point with the all frequency locking circuitry turned off.
2. The frequency reference is activated and permitted to reach a stable operating point.
3. The PDH servo system is activated and the laser frequency is scanned using e.g. Actuator1 in FIG. 2 until the laser frequency is such that Servo1 is within its locking range. This step may be performed by, for example, monitoring light transmission through the etalon on receiver 2. Such transmission indicates that the laser frequency is close to the center of the etalon transmission peak. At that point the PDH servo locks the laser to an etalon order.
4. The second servo system and associated circuitry are activated to lock the VCO to the etalon FSR. This may be done by sweeping the VCO over a predetermined frequency range to locate the FSR.
5. The frequency comparator is used with Actuator2 to drive the etalon FSR to become equal to the reference frequency.
6. The control system monitors the system to ensure that both servo systems are locked and activates a suitable re-acquisition sequence in the event of a loss of lock condition.

A loss of lock condition may occur as the result of faults in parts, but is generally induced by a sudden change in the system, such as a mechanical shock that causes the laser frequency to jump. When such a condition occurs the lock needs to be re-acquired. One simple method to re-acquire lock is to reset the system to step 3 in the above sequence. An alternative and faster method is to implement a second etalon with a low finesse that has a very wide frequency locking range. A method for implementing a second etalon to automatically re-acquire lock in a rapid manner that also permits construction of a system where an appropriate frequency locking error signal for the PDH part of the system always exists is discussed in co-pending U.S. patent application Ser. No. 11/066,683 by the present inventor and incorporated herein by reference.

Figure 5:
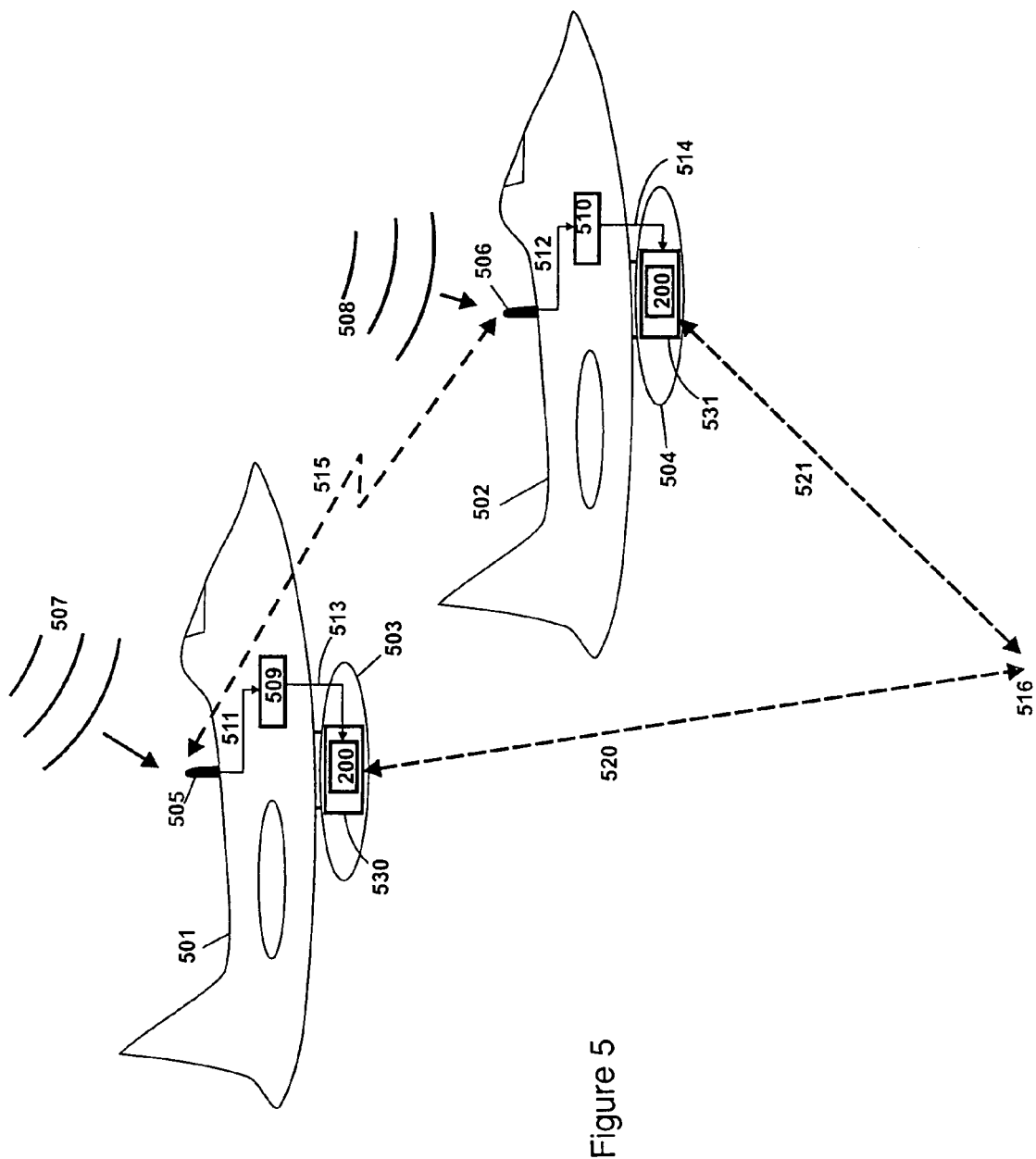
FIG. 5 illustrates the principle of locking multiple physically separated lasers to the same frequency.

From the preceding discussion it is clear that the invention can be used to accurately stabilize a laser at a desired frequency derived from a stable reference frequency. The invention can also be utilized to stabilize a multiplicity of lasers to the same frequency. An example of the use of such co-stabilization is illustrated in FIG. 5. In FIG. 5 are shown two aircraft 501 and 502 that carry laser radar systems 530 and 531 in pods 503 and 504 attached to the respective aircraft. The laser radar systems interrogate a target location 516 by sending and receiving laser beams along paths 520 and 521. In order to synchronize phase measurements carried out from the two spatially separated aircraft each one is equipped with an antenna (505 and 506). In one implementation the antennas receive GPS signals 507 and 508 from one or more satellites (not shown). The received signals are transported as 511 and 512 to electronics units 509 and 510 which phase locks clocks in 509 and 510 to the received GPS signals. The phase locked clocks take the functionality of the reference frequency source 239 shown in FIG. 2, which then permits the two stabilized lasers 200 in the two laser radar systems 530 and 531 to be locked very accurately to the same frequency through connections 513 and 514. In cases where the "GPS disciplined" clocks in 509 and 510 do not coincide with a convenient etalon frequency the clock frequency may be converted to the etalon frequency without loss of phase information. In a second implementation that does not rely on GPS for clock synchronization, multiple systems may be operated in a master-slave arrangement. In such a case one internal clock, such as one in unit 509, is designated as the master clock and the others (exemplified by the one in 510) are phase locked to the master clock. This is accomplished by establishing a wireless link 515 (such as a radio-frequency, microwave, or optical link) between the two systems. In this case antenna 505 is used to transmit clock signals to receiving antenna 506, which synchronizes the internal clock in 510 to the received signal. When this arrangement is implemented GPS position information may still be used to provide relative position between the aircraft. Such relative position information may alternatively be established using radio-frequency, microwave, or optical techniques.

6. ALTERNATIVE EMBODIMENTS

The invention can also be implemented using a number of variations in the architecture. These include, but are not limited to, the following.

Figure 6:
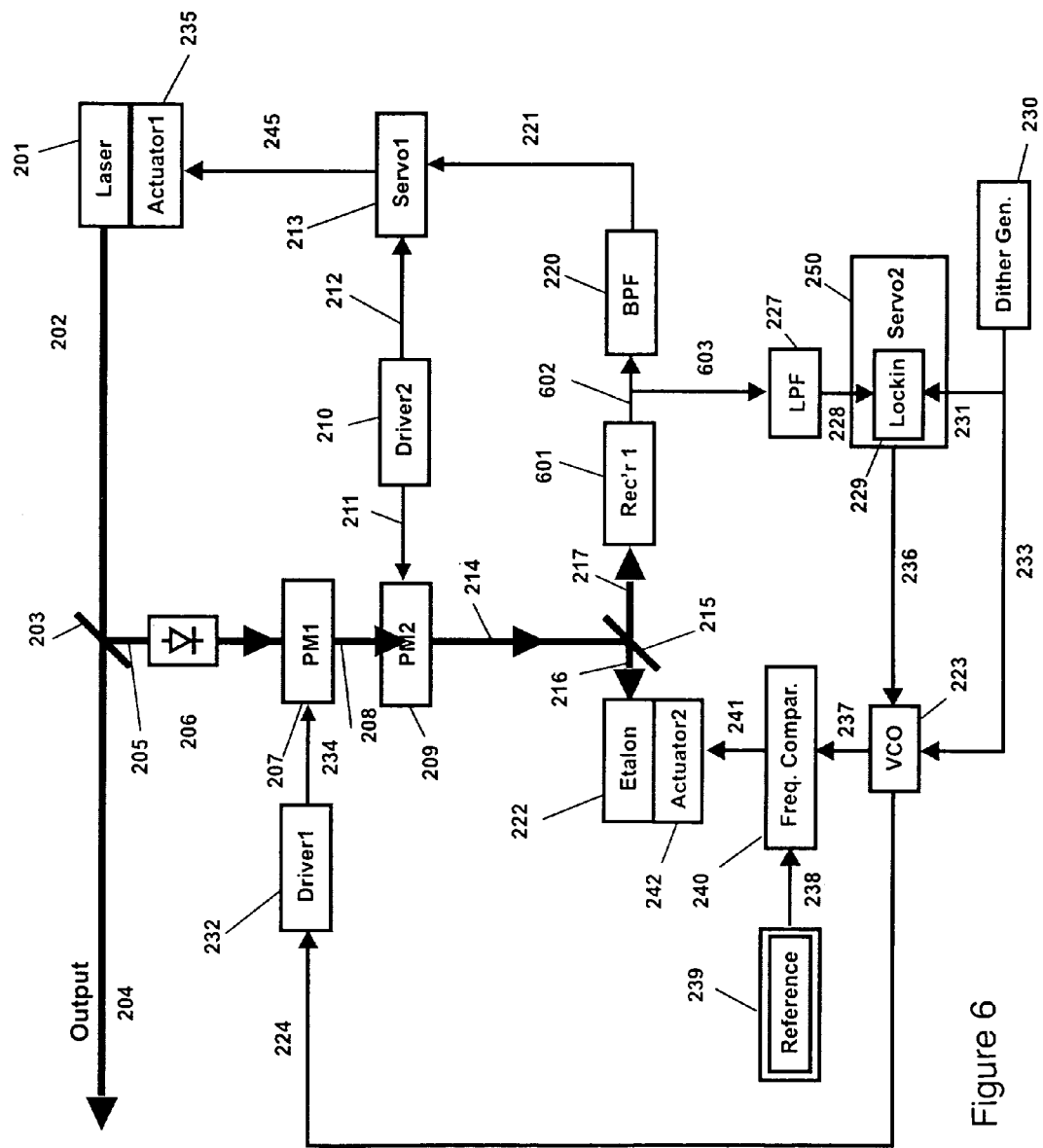
FIG. 6 illustrates an alternative embodiment of the invention where only one detector is used.

The FSR locking has been described with reference to FIG. 2 by detection of light transmitted through the etalon. This locking can also be performed by reflecting light from the etalon as illustrated in FIG. 6. Numerals that are identical in FIG. 2 reference items already described above and will not be described again. The primary difference is that Rec'r2 has been eliminated and both PDH and dither signals are received by Rec'r1 601. The electrical output 602 from Rec'r1 is split into two parts that differ in their frequency content. Because of the differing frequency content these two parts can easily be split. One part is processed through band-pass filter 220 as discussed above. The second part 603 is lock-in detected by 229 and Servo2 produces a control signal 236 as discussed above. It is noted that when detecting is by reflection, rather than transmission, the etalon transmission curves shown in FIG. 4 should be interpreted as etalon reflectivity curves.

Figure 7:
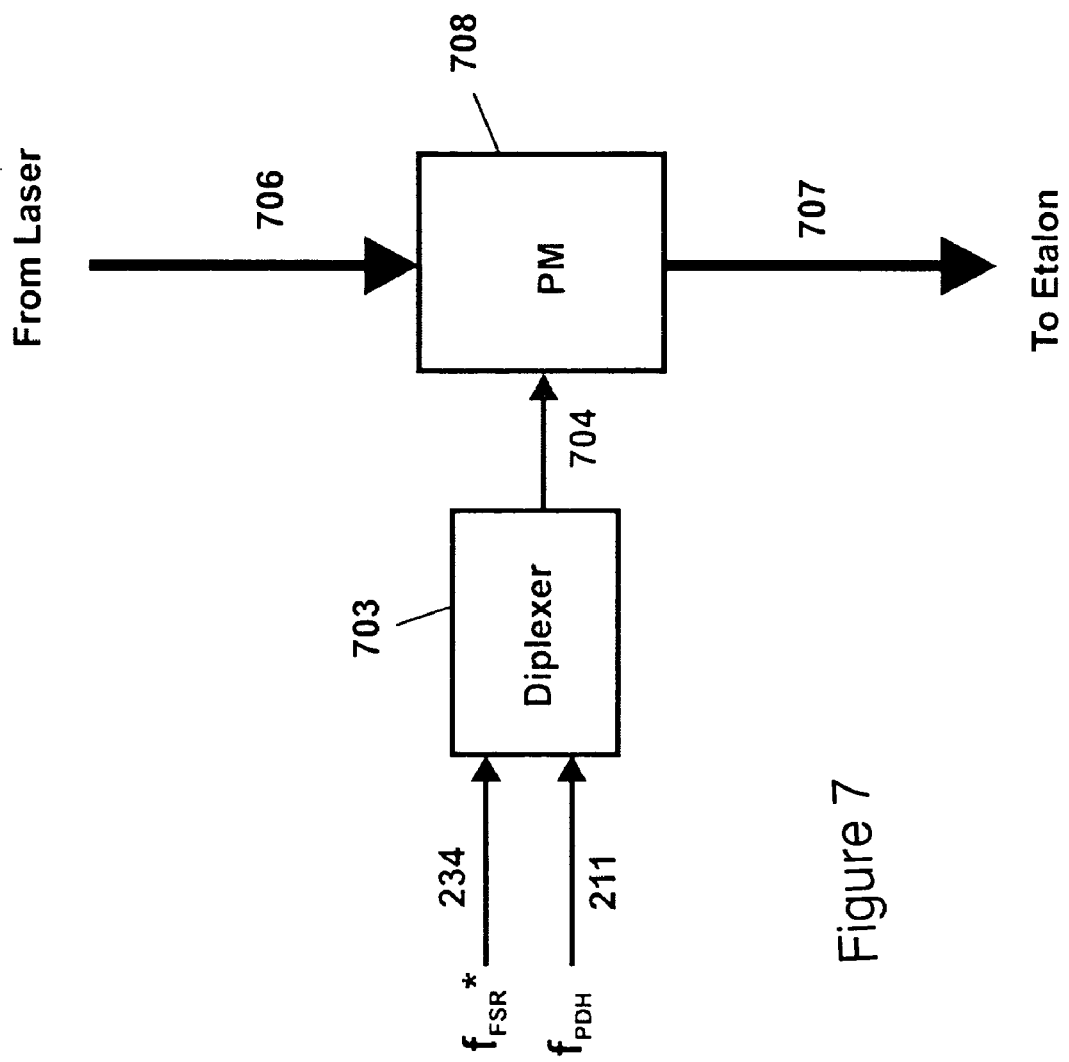
FIG. 7 illustrates the use of a single phase modulator to impose multiple modulation sidebands.

The system has been described as containing two phase modulators 207 and 209. It is also possible to replace these with a single modulator using the exemplary configuration shown in FIG. 7. In FIG. 7 drive signals 234 and 211 are combined in diplexer 703 to produce a single signal 704 that drives single phase modulator 708. As a consequence laser beam 706 incident on phase modulator 708 emerges as output beam 707 (corresponding to beam 214 in FIG. 2) and contain all sidebands required for both PDH locking and FSR locking as described above.

A number of techniques exist that make use of etalons for locking a laser to an etalon transmission peak, of which PDH-locking is merely a commonly used example. Such alternative techniques can clearly be used in conjunction with the present invention in place of PDH locking.

Specific elements used to illustrate the invention can be replaced with other specific elements as long as the functional elements of the invention are retained. For example, the VCO may be replaced by a frequency synthesizer. Other specific elements, in particular electronic frequency filters, may not be required for the invention to operate properly but are included in the disclosure because they are frequently incorporated for convenience in separating signals at different frequencies.

In the above discussion the sequence of achieving a frequency locked laser is to first lock a laser to an etalon order, then lock a radio-frequency signal at $f_{FSR}*$ to the etalon FSR, and finally to lock the etalon FSR to a reference frequency using $f_{FSR}*$ as a proxy. It is also possible to reverse the functionality of elements such that $f_{FSR}*$ is not adjusted to equal the etalon FSR, but rather $f_{FSR}*$ is held constant and the etalon FSR is adjusted to equal $f_{FSR}*$. This may be accomplished, as an example, by mounting one etalon mirror to a piezo-electric translator (PZT) such that the length of the etalon—and hence its FSR—changes with changes in the voltage applied to the PZT. In one alternative embodiment the FSR is then locked to $f_{FSR}*$ and $f_{FSR}*$ is then locked to the reference frequency $f_{REF}$. In this alternative embodiment of the invention it is then also possible to let the frequency $f_{FSR}*$ be the reference frequency, i.e. the reference frequency may directly drive the phase modulator 207 in FIG. 2, which may have certain advantages in simplifying the hardware. In such an implementation the steps required to lock the laser frequency are:

1. Lock laser to an order of the etalon using e.g. PDH locking.
2. Apply phase modulation sidebands at $f_{FSR}*=f_{REF}$.
3. Sweep the etalon length until the sidebands are at least partially transmitted through the etalon.
4. Dither the etalon length at a frequency $f_M$ and use lockin detection and a servo to control the mean length of the etalon such that the FSR equals the reference frequency $f_{REF}$.

An exemplary architecture to implement this alternative embodiment is illustrated in FIG. 8. The majority of elements are identical to those shown in FIG. 2, however, there are important differences. In the FIG. 8 implementation reference frequency generator 239 sends its output signal to Driver1 232 and consequently phase modulator PM1 207 produces laser sidebands at $+f_{REF}$ and $-f_{REF}$ relative to the laser frequency f. The dither generator 230 again sends a signal 233 to lockin 229 in order that it can detect the phase sign of signal 260 transmitted through the etalon 222. An important difference between the architecture of FIG. 8 and that in FIG. 2 is that Servo 2 produces a composite signal 801 which is sent to Actuator 242. One part of the signal is a control signal to alter the length of etalon 222 depending on whether the etalon FSR is higher or lower than $f_{REF}$. The other part of the signal is a dither derived from signal 233 such that the etalon length is dithered by a small amount to produce the signal 228 used to determine errors in the etalon FSR compared with the reference frequency. As noted acquiring lock with this architecture generally requires that the etalon length is first swept until partial etalon transmission occurs. This functionality can easily be incorporated for example in Servo2 810 but is not explicitly shown in FIG. 8.

The use of the invention is not limited to any specific application for which the laser output is used. On the contrary, the technique can be applied to any laser that needs to be stabilized in absolute frequency with a higher degree of precision that is afforded by simple etalon transmission methods (e.g. telecommunications wavelength lockers), while also affording the opportunity to implement the absolute frequency stabilization without the high cost and complexity typically associated with stabilizing length standards. This technique can, for example, advantageously be used in telecommunications systems where the frequency stability requirements are stricter than those associated with e.g. ITU grid spacings of 50 or 100 GHz.

There is no specific requirement on the etalon used in the invention except that it should be designed to meet the frequency locking and stability requirements. For high frequency stability it may be desired to utilize etalons with a finesse in the range of, for example, 10,000 to 100,000, but operation with lower or higher values is clearly also possible. Similarly the length of the etalon is not critical to the operation. Lengths that produce FSRs in the range of 1-10 GHz are frequently used with stable lasers, but etalons with any FSR can be used.

As noted it is clearly possible to add optical filters to the system in order to ensure that only light within a desired spectral band reaches the etalon. Such filters could be fixed or switchable, such that, as an example, the filter is switched on to ensure that upon initial locking the laser locks to a specific etalon transmission peak. In this case the filter would typically be designed such that the spectral transmission is high over a frequency range less than one FSR. Following this initial lock the filter would be switched off to permit light from the multiple frequencies corresponding to different FSRs to reach the etalon.

In discussing the preferred embodiment it was noted that the etalon FSR should be locked to the reference frequency $f_{REF}$. This is not strictly the case. A more general description would be that the two frequencies should have a harmonic relationship such that $N \cdot FSR = M \cdot f_{REF}$, where N and M are integers. If more desirable one could, for example, arrange the frequencies such that $f_{REF}$ equals twice the FSR. Alternatively one could generate harmonics from the reference frequency and lock one of those harmonics to the FSR. In yet one more variation one could produce higher harmonics in PM2 by driving it with a sufficiently high modulation index and lock the etalon to such generated harmonics.

While the present invention has been shown and described in the context of specific examples and embodiment thereof, it will be understood by those skilled in the art that numerous changes in the form and details may be made without departing from the scope and spirit of the invention as encompassed in the appended claims.

What is claimed is:

1. A method for stabilizing the absolute frequency f of a single laser in relation to a stable reference frequency $f_{REF}$ comprising the steps of:
    (a) locking the frequency f of the single laser to a resonant frequency of an etalon;
    (b1) generating sidebands at frequencies $f-f_{FSR}*$ and $f+f_{FSR}*$ wherein $f_{FSR}*$ approximates the FSR of the etalon;

(b2A) temporally dithering the sideband frequencies $f-f_{FSR}*$ and $f+f_{FSR}*$ by a small magnitude $f_D$ at frequency $f_M$;

(b2B) detecting the intensity response (transmission or reflection) of the etalon at the sideband frequencies $f-f_{FSR}*$ and $f+f_{FSR}*$ at dither frequency $f_M$;

(b2C) comparing the phase of the intensity response at frequency $f_M$ with the phase of the dither signal at frequency $f_M$ to generate a first error signal;

(b2D) adjusting $f_{FSR}*$ to minimize the magnitude of the first error signal; and (b3) adjusting the etalon FSR to cause the $f_{FSR}*$ to match $f_{REF}$.

2. The method of claim 1 wherein step (b3) further comprises the steps of:

(b3A) comparing $f_{FSR}*$ to reference frequency $f_{REF}$ to generate a second error signal; and (b3B) adjusting the etalon FSR to minimize the magnitude of the second error signal.

3. The method of claim 1 wherein step (a) is accomplished using PDH frequency locking.

4. A method of stabilizing a single laser frequency f utilizing an etalon having a resonant frequency approximating the laser frequency f and having an FSR, and utilizing a frequency reference generator providing a reference frequency $f_{REF}$ approximating the FSR, the method comprising the steps of:

(a) locking the frequency f to the resonant frequency of the etalon;

(b) generating sidebands at frequencies $f-f_{FSR}*$ and $f+f_{FSR}*$ wherein $f_{FSR}*$ approximates the FSR of the etalon;

(c) temporally dithering the sideband frequencies $f-f_{FSR}*$ and $f+f_{FSR}*$ by a small magnitude $f_D$ at frequency $f_M$;

(d) detecting the intensity response (transmission or reflection) of the etalon at the sideband frequencies $f-f_{FSR}*$ and $f+f_{FSR}*$ at dither frequency $f_M$;

(e) comparing the phase of the intensity response at frequency $f_M$ with the phase of the dither signal at frequency $f_M$ to generate a first error signal;

(f) adjusting $f_{FSR}*$ to minimize the magnitude of the first error signal;

(g) comparing $f_{FSR}*$ to a reference frequency $f_{REF}$ to generate a second error signal;

(h) adjusting the etalon FSR to minimize the magnitude of the second error signal.

5. The method of claim 4, wherein step (a) is accomplished with PDH frequency locking.

6. Apparatus for stabilizing the frequency f of a single laser utilizing an etalon, and a stable reference frequency $f_{REF}$, the apparatus comprising:

a phase modulator for generating sidebands at frequencies $f-f_{FSR}*$ and $f+f_{FSR}*$ wherein $f_{FSR}*$ approximates the FSR of the single etalon;

a first servo loop configured to match the laser frequency f to a resonant frequency of the etalon;

a second servo loop configured to adjust $f_{FSR}*$ to match the etalon FSR; and a third servo loop configured to adjust the etalon FSR to cause $f_{FSR}*$ to match $f_{REF}$.

7. The apparatus of claim 6, wherein the first servo loop includes a first servo and comprises PDH frequency locking circuitry.

8. The apparatus of claim 6 wherein the second servo loop comprises:

a dither source for temporally dithering the sideband frequencies $f-f_{FSR}*$ and $f+f_{FSR}*$ by a small magnitude $f_D$ at frequency $f_M$;

a detector for detecting the intensity response (transmission or reflection) of the etalon at the sideband frequencies $f-f_{FSR}*$ and $f+f_{FSR}*$ at dither frequency $f_M$;

a second servo including a phase detector for comparing the phase of the intensity response at frequency $f_M$ with the phase of the dither signal at frequency $f_M$ to generate a second-servo error signal; and a driver for adjusting $f_{FSR}*$ to minimize the magnitude of the second-servo error signal.

9. The apparatus of claim 6 wherein the third servo loop comprises:

a third servo containing a phase-lock loop for comparing $f_{FSR}*$ to a reference frequency $f_{REF}$ and for generating a third-servo error signal; and an actuator for adjusting the etalon FSR to minimize the magnitude of the third-servo error signal.

10. The frequency stabilized laser system of claim 6 wherein the first servo uses polarization locking.

11. The frequency stabilized laser system of claim 6 wherein the first servo loop uses tilt locking.

12. The frequency stabilized laser system of claim 6 wherein said frequency locking apparatus and said FSR locking apparatus utilize the same phase modulator.

* * * * *